United States Patent [19]

Cowan

[11] Patent Number: 4,537,214
[45] Date of Patent: Aug. 27, 1985

[54] SINGLE SEAL PIPELINE TAPPING FIXTURE HAVING SECURE VALVE

[75] Inventor: Arnold A. Cowan, Encino, Calif.

[73] Assignee: Gem Products, Inc., Garden Grove, Calif.

[21] Appl. No.: 672,696

[22] Filed: Nov. 19, 1984

[51] Int. Cl.³ .............................................. F16K 43/00
[52] U.S. Cl. ..................................... 137/318; 285/197
[58] Field of Search ....................... 137/315, 317, 318; 285/197, 198, 199

[56]  References Cited
U.S. PATENT DOCUMENTS

| | | | |
|---|---|---|---|
| 3,115,889 | 12/1963 | Franck et al. | 137/318 |
| 3,148,696 | 9/1964 | Hoke | 137/318 |
| 3,198,206 | 8/1965 | O'Brein | 137/318 |
| 3,252,474 | 5/1966 | Ehrens | 137/318 |
| 3,252,475 | 5/1966 | Jones | 137/318 |
| 3,428,075 | 2/1969 | Wagner | 137/318 |
| 3,554,217 | 1/1971 | Ehrens et al. | 137/318 |
| 3,973,584 | 8/1976 | McKinnon et al. | 137/318 |
| 3,978,881 | 9/1976 | Mouranie | 137/318 |
| 4,018,246 | 4/1977 | Langstroth | 137/318 |

Primary Examiner—George L. Walton
Attorney, Agent, or Firm—Cislo, O'Reilly & Thomas

[57]  ABSTRACT

A piercing valve comprises upper and lower blocks having, respectively, lower and upper mating surfaces. Each mating surface has a positionally corresponding generally linear groove extending thereacross. The upper block has a cylindrical bore extending vertically therethrough and intersecting the grooved lower surface thereof. An upper bore section is adapted for receiving screw threads, with the topmost section of the bore having a diameter less than that of the threaded upper section thereof; the lower section of the bore is of a diameter larger than that of the upper section. The upper block further has an access port extending therethrough and intersecting the bore along the lower section thereof, a cylindrical piercing needle, and a cylindrical unitary seal. The piercing needle has an upper threaded portion having a radial diameter suitable for engaging the threads of the bore, a coaxial central portion having a decreasing radial diameter, and a coaxial lower portion having means for tapping an access hole. A cylindrical seal having a gas or liquid communication there through so as to permit the communication of the gas or liquid from a point external to the mated upper and lower portions of the block into the region defined by the grooves thereof is coaxially interposed between the valve and the inner bore surface of the upper fixtures. The seal further extends above the intersection point of the access port with the bore and is of a length to make sealing contact with the surface of the pipeline being pierced.

10 Claims, 5 Drawing Figures

SINGLE SEAL PIPELINE TAPPING FIXTURE HAVING SECURE VALVE

BACKGROUND OF THE INVENTION

The present invention relates generally to valves having an integral tap for piercing an otherwise sealed pipeline and, more particularly, to a unitized fixture having a piercing needle valve screw fitted within a single seal and secured within the fixture housing so as to prevent the complete removal of the valve screw.

In the service of various closed loop, pressurized gas systems, including refrigerant type systems in particular, there is often a need to access the system to recharge or discharge the gasses contained therein. As may occur quite often, the system access port may not be readily accessible due to the physical inaccessibility of the port or simple failure of the valve portion thereof rendering the port unreliable in terms of the ability to be resealed.

Consequently, a variety of valves have been developed to provide a ready means of tapping the pipeline of closed systems and to immediately provide valved access thereto. An exemplary valve is shown and described in U.S. Pat. No. 3,973,584, entitled "Piercing Valve for Tapping Pipelines", issued Aug. 10, 1976. The valve described provides upper and lower block portions that are adapted to receive corresponding portions of any desired short straight length of the pipeline. A screw tap bearing a piercing needle is provided to initially tap the pipeline. The hole created thereby is allowed to freely communicate with a port access inlet passage provided in the top block portion when the screw is backed off. A first seal is provided around the pierced hole at the pipeline/top block interface. A second seal is provided between the screw tap and the top block interface at the point that the screw tap is externally accessible. A third seal is provided by way of and within an external screw-on cap covering the port access inlet passageway when not otherwise being used. Thus, the valve may be essentially permanently attached to the pipeline, ensuring proper initial registration of the tap and pipeline and subsequent capping of the tapped hole to ensure the most minimal gas leakage from the system.

There are, however, a number of inherent practical problems with the known valves. They include the necessity to be adaptable to a variety of pipeline diameters, to effectively seal the tapped hole over long periods of time, to be resistant to tampering as well as inadvertent mistake, and minimize the possibility of system contamination throughout the process of tapping the port hole, recharging the system and capping off the port hole. Not least of all, the valve must be cost effective in its day-to-day usage.

OBJECTS AND SUMMARY OF THE INVENTION:

It is, therefore, an object of the present invention to provide an externally attachable, sealed pipeline system piercing valve.

It is another object of this invention to provide means to prevent removal of the piercing needle valve screw used in piercing valves.

It is still another object of this invention to provide a unitary seal for preventing the escape of fluids once the valve is secured onto a pipeline and the piercing needle retracted.

These and further objects of the invention will become apparent from the hereinafter following commentary taken in conjunction with the drawing.

In accordance with the invention, a sealed pipeline system valve is provided which comprises upper and lower blocks having, respectively, lower and upper mating surfaces. The mating surfaces each have a positionally corresponding generally linear groove extending thereacross. The valve upper block has a generally cylindrical bore (piercing needle opening) extending vertically therethrough and intersecting the grooved lower surface thereof, the upper section of the bore being adapted for receiving screw threads, with the topmost section of the bore having a diameter less than that of the threaded upper section thereof. The lower section of the bore has a diameter greater than that of the threaded section, defining a sealing chamber. The upper block further has (1) an access port extending therethrough and intersecting the bore along the cylindrical length thereof, (2) a cylindrical piercing needle, and (3) a cylindrical unitary seal coaxially interposed between the piercing needle and the inner bore surface of the upper block. The piercing needle has (1) an upper threaded portion having a radial diameter suitable for engaging the threads of the bore, (2) a coaxial central portion having a decreasing radial diameter, and (3) a coaxial lower portion having means for tapping or piercing an access hole in the pipeline. The cylindrical seal includes a hole extending through the cylindrical wall thereof and permits the communication of a gas or liquid from a point external to the mated upper and lower portions of the valve block into the region defined by the grooves thereof. The seal extends above the intersection point of the access port with the bore and is of a length to make sealing contact with the surface of the pipeline being pierced.

Figure 1:
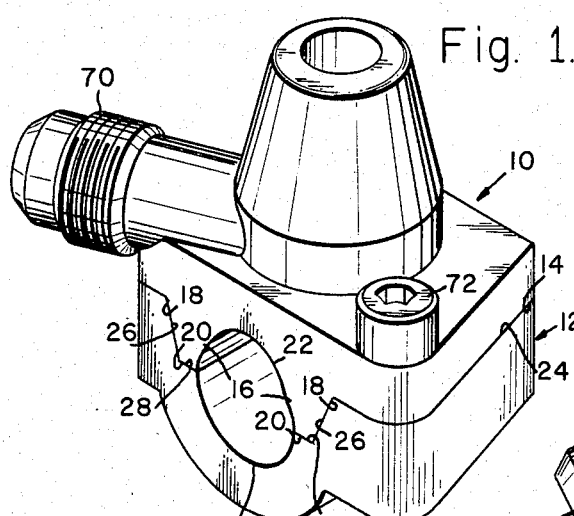
FIG. 1 is a three-dimensional view of the valve of the invention.

DESCRIPTION OF THE BEST EMBODIMENTS CONTEMPLATED:

Referring to the drawing wherein like numerals of reference designate like elements throughout, a piercing valve for tapping pipelines is illustrated. Generally, the piercing valve may be formed of appropriate materials commonly employed in the art and by the usual manufacturing procedures except as hereinafter specifically pointed out. Furthermore, again except as hereinafter pointed out, although the various components of the piercing valve are formed having specific shapes and contours, it is not intended to limit the broader principles of the present invention to the specific forms shown, but rather, the principles of the present invention should be broadly construed within the limitations presented by the prior art.

The preferred embodiment of the piercing valve of the present invention includes vertically assemblable valve upper and lower blocks generally indicated at 10 and 12, respectively. The valve upper block 10 has a lower relatively flat surface 14 and a downwardly depending step portion 16 defined by relatively flat vertical surfaces 18 and relatively flat surface 20 parallel to surface 14. In a preferred embodiment, a longitudinal semielliptical groove 22 is formed in the downwardly depending portion 16 and extends completely longitudinally therethrough and allows for tube compression and desired configuration for the intended function to be employed thereon. In some instances, it may be found desirable to have a semi-circular groove 22. The valve lower block 12 has an upper relatively flat surface 24 and an indentation corresponding to the downwardly depending portion 16, defined by relatively flat vertical surfaces 26 and relatively flat surface 28 parallel to surface 24. Surfaces 14 and 24 are in mating contact, as are surfaces 18 and 26 and surfaces 20 and 28. A semicircular groove 30 is formed in the indentation of the valve lower block 12 and extends completely longitudinally therethrough and registering with the upper block groove 22 in the valve assembly as shown.

Thus, in general terms and to the extent similar to the prior constructions, the valve upper and lower blocks 10 and 12 may be assembled with the respective lower and upper surfaces 14 and 24, vertical surfaces 18 and 26 and respective lower and upper surfaces 20 and 28 drawn into abutment and with the registering grooves 22 and 30 receiving a pipeline section 32 (shown in cross-section in FIGS. 3 and 4), the pipeline section, for instance, being a part of the pipeline system of a typical refrigeration unit.

In particular, the groove 30 of the lower block 12 is formed of the usual semi-circular transverse cross-section throughout, while the groove 22 of the upper block 10 is advantageously formed generally semi-elliptical in transverse cross-section throughout. In other words, approximately the lower one-half of the upper block groove 22 is formed with a greater or larger cross-sectional radius than the upper one-half of the groove which is formed with a lesser or smaller cross-sectional radius so that the groove appears to slightly bulge upwardly and has a sharper arcuate surface.

Such a configuration forces a deformation of the pipeline to the contours of the grooves 22 and 30 when the piercing valve is clamped to a pipeline, as described below. The sharper radius of the thus-deformed pipeline results in an increased rigidity of the pipeline at that site, thereby preventing any adverse deformation of the pipeline during the piercing operation, as described in greater detail in the above-referenced U.S. Pat. No. 3,973,584. Both of the grooves 22 and 30 are preferably of uniform dimensions throughout the longitudinal extents thereof.

As is conventional, shims (not shown) may be employed for adapting the registering upper and lower blocks 10 and 12 to a smaller cross-sectional size of pipeline section or may be omitted (as depicted here) for larger pipeline cross-sections.

The valve upper block 10 is formed with a generally vertical, generally cylindrical bore, or piercing needle opening 34, generally vertically therethrough opening upwardly of the block and opening downwardly transversely bisecting the groove 22. A piercing needle generally indicated at 36 is received in the needle opening 34, selectively vertically adjustable through threaded engagement thereof. The piercing needle 36 includes an upper threaded portion 38, a coaxial central portion 40 of lesser diameter and a lower coaxial portion 42 having a tip 44 for tapping or piercing an access hole in the pipeline 32.

In accordance with one embodiment of the invention, the piercing needle opening 34 is formed such that at its uppermost end 46, it tapers to a smaller diameter than that of the portion receiving the piercing needle. This may be obtained by leaving the upper most area of end 46 unthreaded. As a consequence, the piercing needle is securely maintained within the valve upper block 10 and may not be extracted from the assembly. Thus, neither deliberate tampering nor inadvertent mistake in removal of the piercing needle from the assemblage of the valve is possible.

An annular seal chamber 48, formed by larger diameter bore 45 and smaller diameter bore 47, is formed in the upper block 10 by enlargement of the lower extremity of the needle opening 34 and extending to the groove 22. However, it is obvious that the chamber 48 may be formed as a single tapered bore. In accordance with another embodiment of this invention, a unitary seal 50, which provides for three surface or point fluid sealing, is provided which occupies the seal chamber 48. The seal 50 is adapted to receive the piercing needle 36 through opening 52, while maintaining sealing contact with a portion 40 of the piercing needle 36 along inner bead surface 54. The topmost portion 56 of the seal 50 maintains sealing contact with the upper portion of the sealing chamber 48 and with the walls of the sealing chamber by means of annular portion 58. The intermediate interior surface 63 forms still another seal with the intermediate coaxial section or surface 43 of piercing needle 36. The intermediate seal portion 63 forms a sealing surface at the transfer passageway 68 such that the prior art end caps normally positioned on the access port 66 to prevent fluid flow may be eliminated except for dust exclusion benefits. The bottommost portion 60 of the seal 50 is in sealing contact with the pipeline 32 and surrounds the area of piercing. The sealing surfaces 61 of seal 50 also form fluid tight seals adjacent the passageway 68 to prevent charging fluid egress. A single sealing surface may also suffice.

A portion 62 of the seal 50 is of a smaller diameter than that of the annular portion 58 and is provided with an opening 64 for venting or admitting fluids (gasses or liquids), as further discussed below. The seal 50 comprises any of the resilient or elastomeric materials commonly employed in seals in sealing art.

Figure 2:
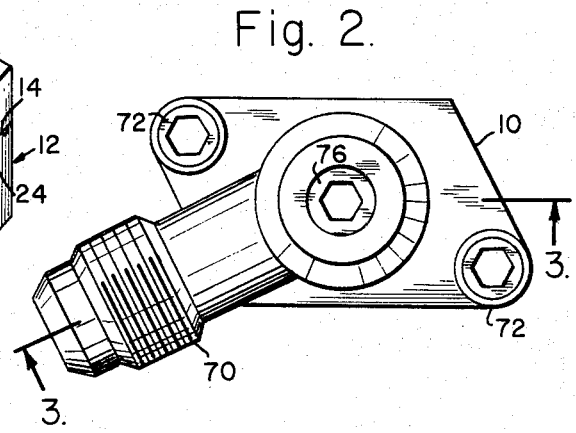
FIG. 2 is a top plan view of the valve depicted in FIG. 1.

The upper block 10 is completed by a usual access port 66 having a transfer passageway 68 formed therein opening inwardly intermediate of the sealing chamber 48 and opening outwardly of the upper block. The access port 68 is provided on its exterior with threads 70 for sealing of the passageway or for connection to an auxiliary pipeline (not shown) in communication with the passageway 68 for venting fluids or for providing recharging fluids. Finally, the upper and lower blocks 10 and 12 are drawn into and retained in assembly by usual bolts 72 shown in FIGS. 1 and 2.

Figure 3:
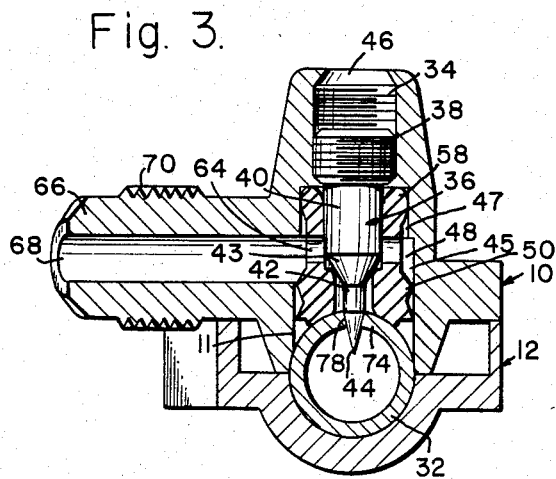
FIG. 3 is a view taken along line 3-3 showing the interior of the valve with the piercing needle depicted in the extended position.
Figure 4:
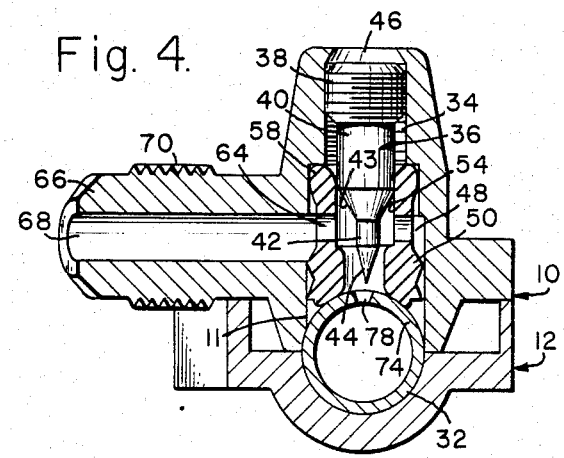
FIG. 4 is a view identical of that of FIG. 3, except depicting the piercing needle in the retracted position.
Figure 5:
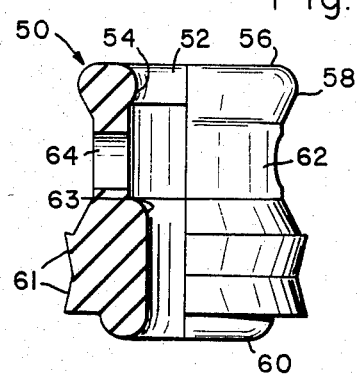
FIG. 5 is an enlarged view, partly in section, of an integral seal member advantageously employed in the invention.

In use of the embodiment of the piercing valve for tapping pipelines of the present invention illustrated herein, the piercing needle 36 is priorly inserted into the threaded piercing needle opening 34 from the bottom of upper valve block 10. The unitary seal 50 is also priorly inserted (from the bottom) into the sealing chamber 48. While the opening 64 of the seal desirably faces the passageway 68, the size relationship between the sealing chamber 48 and the portion 62 of the seal, as seen in FIGS. 3 and 4, permits rotation of the seal in the chamber without loss of communication between the transfer passageway 68 and the pipeline 32. The valve upper and lower blocks 10 and 12 are assembled about the pipeline section 32 at the particular location of the pipeline where a pierced hole is to be formed. At this stage, the piercing needle 36 is in the withdrawn state to the maximum extent possible to avoid piercing the pipeline during assembly of the valve onto the pipeline to be pierced.

As the bolts 72, disposed through the bolt holes and tapped bores of valve blocks 10 and 12 respectively, are fully secured, the mating flat surfaces 14, 18 and 20 of the upper block 10 are drawn fully into abutment with the mating flat surfaces 24, 26 and 28 of the lower block 12. Due to the respective sizes of the upper block groove 22 and the lower block groove 30, the pipeline section is deformed so as to fully conform to the grooves.

The overall result is that the pipeline section 32 is now rigidly and firmly gripped by the upper and lower blocks 10 and 12 within the grooves 22 and 30. At the same time, the wall 74 of the pipeline section 32 is slightly bulged upwardly into a sharper radius at the upper portion thereof by the specific contour of the upper block groove 22 with such sharper radius contour increasing the rigidity thereof against downward forces as will ultimately be applied by the piercing needle 36 during the piercing operation, as more fully described in the abovementioned U.S. Pat. No. 3,973,584. At the same time, the wall 74 of the pipeline section 32 deforms and compresses the seal 50 along surface 60 thereof so as to provide the sealing contacts previously described including that to the pipeline 32 around the piercing needle 36.

At this stage directly prior to the actual piercing operation, if the pressurized gases contained within the pipeline are of a noxious or dangerous nature, an auxiliary pipeline may be coupled to the upper block transfer passageway by means of threads 70 and such fluids vented into an auxiliary container. Otherwise, if the fluids may be safely vented into the atmosphere, the auxiliary pipeline need not be attached at this time. In any event, with the valve assembly now ready for the piercing operation, the piercing needle 36 is progressively threaded downwardly by application of the appropriate tool to the head 76, with the piercing tip 44 engaging and penetrating through the wall 74 of the pipeline section 32 to form a pierced opening 78 as shown in FIG. 3.

The piercing needle 36 is now withdrawn vertically upwardly as shown in FIG. 4, thereby establishing a communication from the interior of the pipeline section 32, through the pierced opening or hole 78 in the pipeline section wall 74, through the interior 52 of the seal 50, through the opening 64 in the seal 50, and into the transfer passageway 68. Thus, the pressurized gasses (or liquids) within the pipeline may flow into the transfer passageway 68 and at an appropriate time, fresh pressurized gasses (or liquids) for recharging the pipeline system may be directed back through the auxiliary pipeline and inwardly along the transfer passageway 68 into the pipeline section 32.

Once the pipeline section is fully recharged with the pressurized fluids, the needle 36 must be adjusted downwardly to form the fluid seals as previously described. The auxiliary pipeline may then be uncoupled from the passageway 68 and may be replaced by a threaded cap (not shown), for keeping dust out should it be necessary in the future to use the valve for future recharging the pipeline.

This sealed valve assembly may be left permanently positioned on the pipeline section 32, permanently sealing the needle opening 34 and without any danger of pressurized fluids leaking through the needle opening 34 and longitudinally along the outer surfaces of the pipeline section 32 due to the unique sealing features of the unitary seal 50 in the seal chamber 48, which seal isnow not only vertically compressed against the pipeline section 32, but is radially outwardly compressed or urged against the upper portion of the sealing chamber 48 both as a function of its designed construction and the increased pressure exerted by the contained pressurized fluids.

According to the principles of the present invention, therefore, a piercing valve for tapping pipelines is provided which includes means for gaining access to the piercing needle 36 for raising or lowering it while preventing the removal thereof, thus providing a secure needle valve. Furthermore, the unique unitary seal 50 of the invention, virtually eliminates the difficulties of metal to metal seals of the prior art constructions.

The unique configuration of the components making up the valve of the invention also allows for ready assembly of the valve assemblage. That is, the upper valve body block has the piercing needle and seal assembled from the underside thereof. In some prior art methods, it has been necessary to assemble the valve components from the top, for example, and thereafter perform operations such as covering of the exterior wall or uppermost end 46 to obtain the captive relationship of the piercing needle 36 within upper block 10.

It should be understood, of course, that the foregoing disclosure relates only to the preferred embodiments of the present invention and that numerous modifications of the design and substitution of the materials may be made without departing from the spirit and scope of the present invention. It is therefore understood that, within the scope of the appended claims, the present invention may be practiced otherwise than as specifically described.

I claim:

1. An externally attachable and sealed pipeline system piercing valve comprising:
   (a) upper and lower blocks having, respectively, lower and upper mating surfaces, said mating surfaces each having a positionally corresponding generally linear groove extending thereacross, said upper block having a generally cylindrical bore extending vertically therethrough and intersecting the grooved lower surface thereof, the upper section of said bore being adapted for receiving screw threads with the topmost section of said bore having a diameter less than that of the threaded upper section thereof, the lower section of said bore having a diameter greater than that of said upper section to define a sealing chamber, said upper block further having an access port extending therethrough and intersecting said bore along said lower section thereof;

(b) a cylindrical piercing needle having an upper threaded portion having a radial diameter suitable for engaging the threads of said bore, a coaxial central portion having a decreasing radial diameter, and a coaxial lower portion having means for tapping an access hole in said pipeline;

(c) a cylindrical unitary seal coaxially interposed in said sealing chamber between said piercing needle and the inner bore surface of said upper block, said seal extending above the intersection point of said access port with said bore and of a length to make sealing contact with the surface of the pipeline being pierced, said seal including an opening extending through the cylindrical wall thereof so as to permit the communication of a fluid from a point external to the mated upper and lower portions of said block into the region defined by the grooves thereof and said needle being adapted to seal and block communication between said access hole and said opening; and (d) means for clamping said upper and lower blocks together about said pipeline.

2. The piercing valve of claim 1 in which said linear groove in said upper block has a semi-elliptical cross-section.

3. A piercing pipeline valve comprising:

(a) an upper block having a cylindrical piercing needle bore hole extending therethrough and a semi-elliptical groove extending along a lower surface of said upper block so as to intersect said bore hole, said groove being suitable for receiving a generally corresponding portion of a pipeline, said bore hole extending generally upward and oriented perpendicular with respect to the groove, with an upper threaded section and a lower section having a diameter larger than that of said upper section, said upper block further having an inlet port and gas access tube intersecting the bore hole along said lower section so as to permit the otherwise free communication of gasses from said inlet port, through the portion of said bore hole and into the semi-elliptical region of said groove;

(b) a piercing needle having a lower tapping needle portion, a central portion characterized by a radial diameter graduated section coaxially interposed between said tapping needle and an upper cylindrical section of generally uniform radial diameter, and an upper threaded portion having a radial diameter generally matching that of the valve bore hole, a corresponding upper portion of said bore hole having appropriately matching threads;

(c) a lower block having corresponding mating surfaces to opposed surfaces of said upper block and having an aligned groove to said semi-elliptical groove extending along said lower block's upper surface to receive an opposed portion of a pipeline as received in said upper block groove.

(d) a seal element coaxially interposed between said piercing needle and the inner bore surface of said upper block, said seal adapted to provide sealing contact against (1) a portion of said piercing needle, (2) the upper portion of said lower section of said bore, and (3) a portion of said pipeline surrounding the area to be pierced, said seal including an opening extending through the cylindrical wall thereof so as to permit and block the communication of a fluid from a point external to the mated upper and lower portions of said upper and lower blocks into the region defined by the grooves thereof; and (e) means for clamping said upper and lower blocks together about a pipeline.

4. The valve of claim 3 in which the topmost section of said bore has a diameter less than that of said threaded section.

5. The valve of claim 4 wherein said seal element is of conformable material.

6. The valve of claim 5 wherein said piercing needle has an enlarged head portion and including a further sealing contact between said seal and said radial diameter graduated section of said piercing needle.

7. The valve of claim 6 wherein said bore hole in said upper block is larger in diameter than said enlarged head portion of said piercing needle.

8. The valve of claim 6 wherein a portion of said bore hole is threaded to threadably receive said piercing needle in threadable relationship therewith.

9. The valve of claim 8 wherein said seal has an upper head portion and a lower enlarged portion having inwardly directed radial surfaces.

10. The valve of claim 8 wherein said seal has a lower most edge innerset from said lower enlarged portion and is bead-like in cross-sectional configuration.

* * * * *